H. T. STEPHENS.
PUNCTURE MENDING DEVICE.
APPLICATION FILED DEC. 19, 1912.
1,131,745.   Patented Mar. 16, 1915.
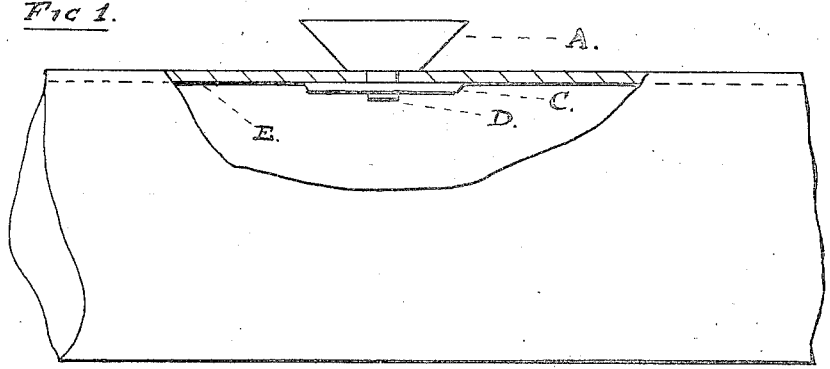
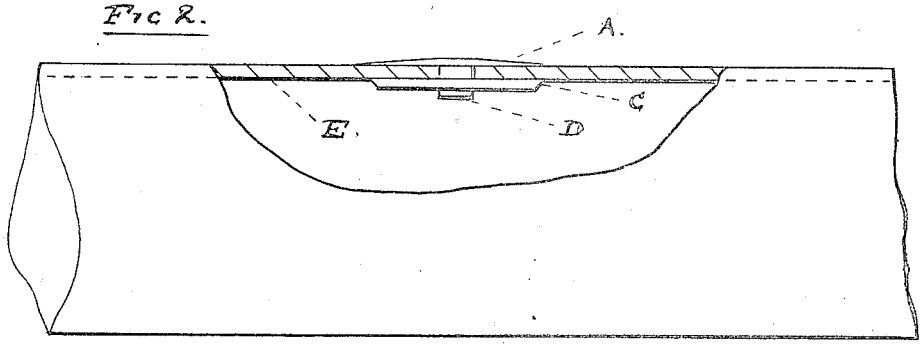
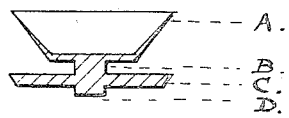
Witnesses.
C. W. Griffiths
W. J. Williams
Inventor:
Hugh Taylor Stephens

UNITED STATES PATENT OFFICE.

HUGH TAYLOR STEPHENS, OF CARMARTHEN, WALES.

PUNCTURE-MENDING DEVICE. REISSUED 1,131,745. Specification of Letters Patent. Patented Mar. 16, 1915.

Application filed December 19, 1912. Serial No. 737,597.

*To all whom it may concern:*

Be it known that I, HUGH TAYLOR STEPHENS, a citizen of Great Britain, residing at 4 Quay street, Carmarthen, in the county of Carmarthen, Wales, England, have invented a new and useful Puncture-Mending Device, of which the following is a specification.

This invention for improvement for repairing pneumatic tires and the like relates to patches adapted to mend the puncture both on the outside and inside and has for this object an improved construction of patch which will facilitate the application of the patch both to the outside and inside at the same time and cause the two parts to be held in position tightly against the sides of the tube or cover as the case may be.

Now according to this invention the patch is provided with an outer part or cup that projects upward from the connecting stem so that when the bottom part or head is in position on the inside of the tube the cup part remains on the outside ready to be stuck down. This cup part is so molded where it joins the stem that when it is pressed down it tends to remain in that position and consequently when in use to draw the head up against the inside of the tube and thus prevent the air getting past the head as happens with others of somewhat similar device. The head is provided on its outer surface with a projection or templet of suitable thickness and contour which when moistened and pressed against the tube leaves a mark to be cut out to receive the stem. The patch may be treated with a suitable adhesive then inserted through the hole and drawn back into position by a pair of pliers when the outside part is now pressed down and the tire is ready for inflation. When used for outer covers the head may preferably be on the outside of the same in which case when the cup is flattened out on the inside the head will be pulled down on the outside. A strong layer of canvas is now stuck over the hollow cup—inside the cover to take the pressure of the air off the damaged part.

Figure 1. shows one of the patches or studs on position in the hole. Fig. 2. shows one of the patches or studs in its closed or protective position. Fig. 3. shows one of the patches or studs in section.

Similar letters refer to similar parts throughout the several drawings.

In Fig. 1 A represents the cup shown outside the tube and not yet turned over. In Fig. 2 A represents the cup turned down on to the tube C represents the head of the stud and E is the tube in section while the stud itself is shown in elevation. Fig. 3 is a section of the stud A being the cup B being the stem C the head and D the templet.

I am aware that prior to my invention other devices have been devised for a similar purpose. I therefore do not claim such a combination broadly; but

I claim:

A tire repair stud comprising a stem, an inverted truncated cone shaped cup on one end of said stem, and a disk upon the other end of said stem, said cup being adapted to be pressed down to clamp the tire against said disk.

HUGH TAYLOR STEPHENS.

Witnesses:
    O. J. WORTH,
    CARL R. LOOP.